Figure 1:
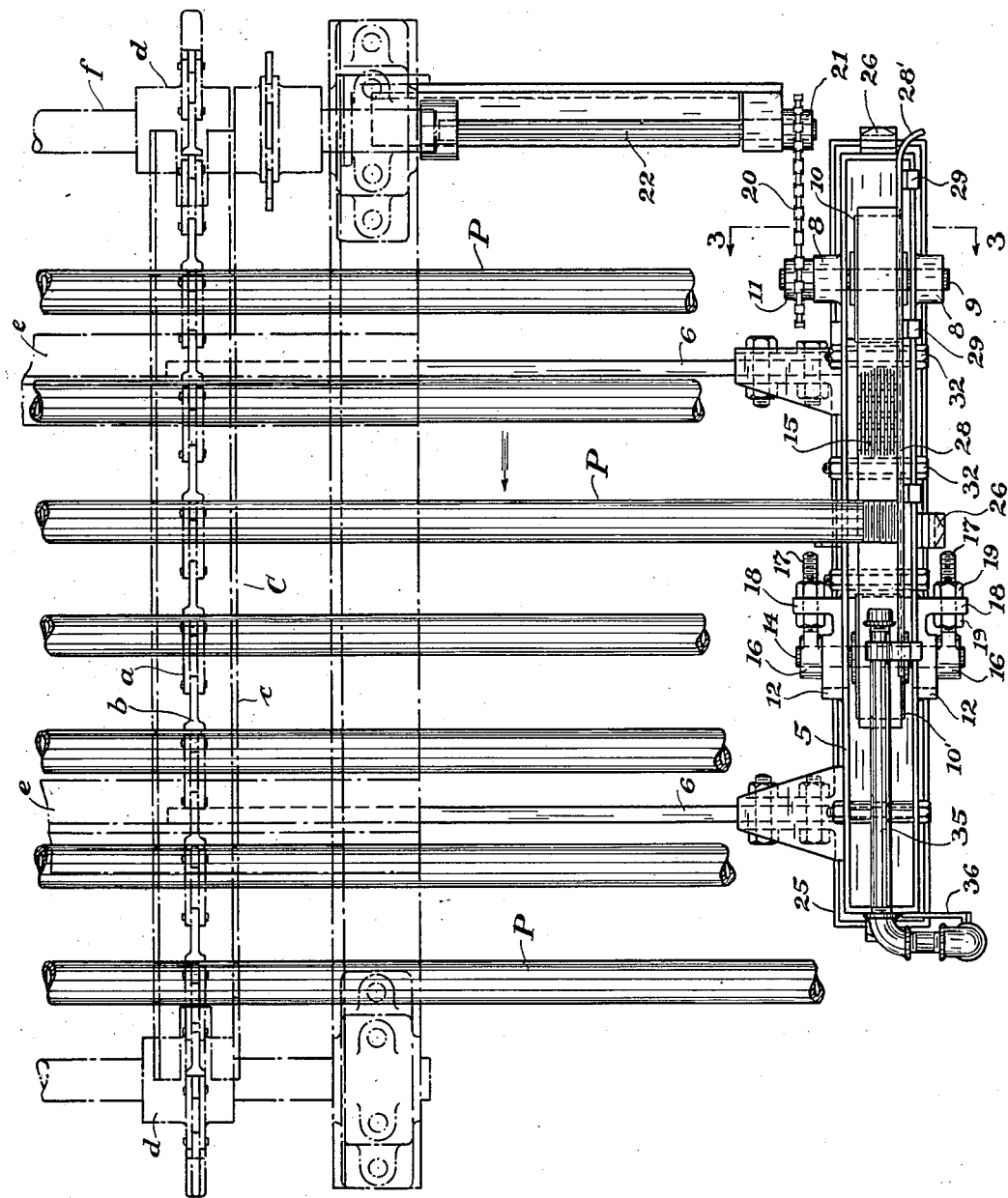

Aug. 20, 1935.  J. SOYLAND  2,011,659
APPARATUS FOR COATING PIPE ENDS
Filed Dec. 27, 1932   2 Sheets-Sheet 1

INVENTOR.
JOHN SOYLAND.
BY
ATTORNEY.

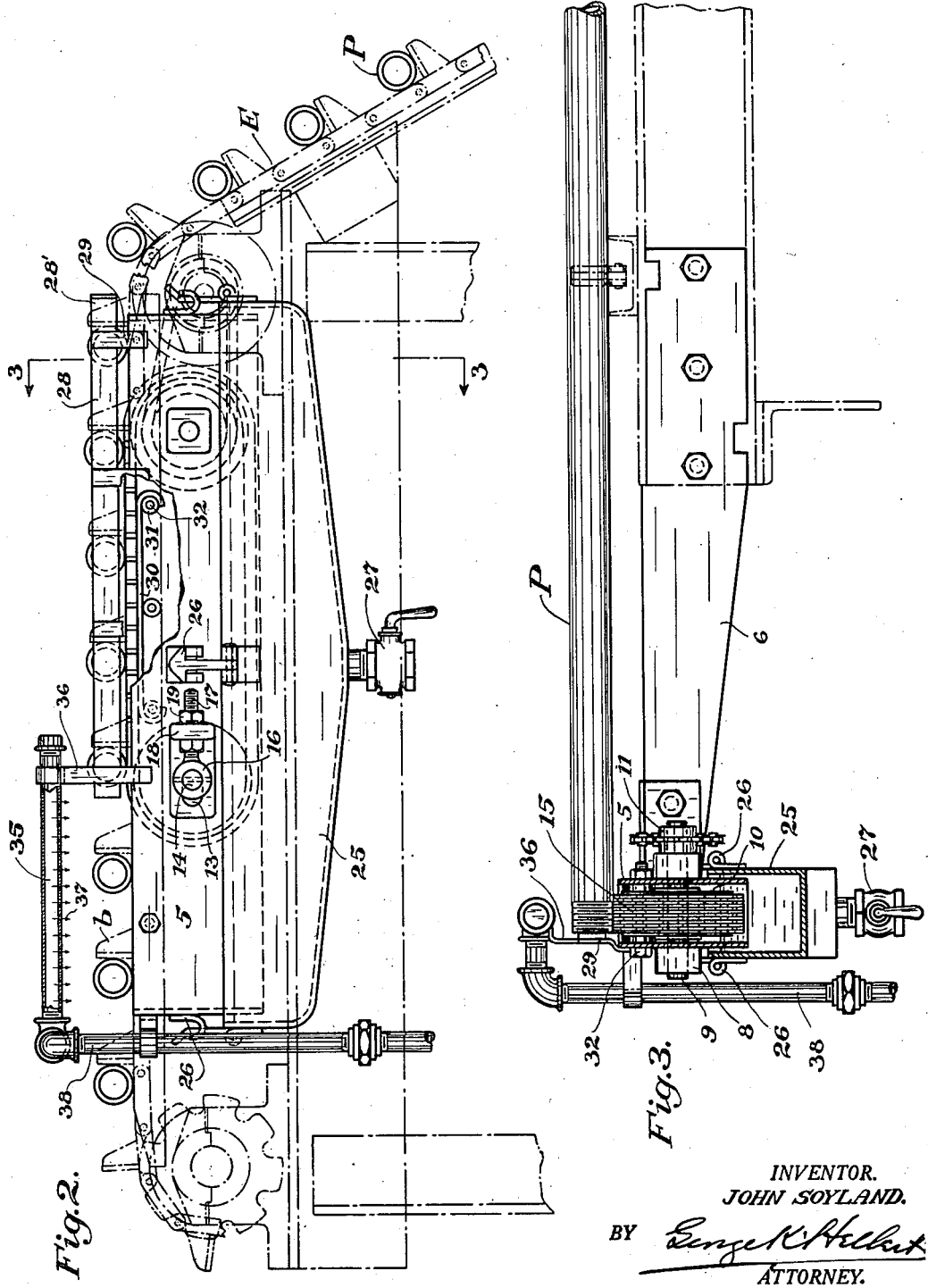

Patented Aug. 20, 1935

2,011,659

UNITED STATES PATENT OFFICE 2,011,659

APPARATUS FOR COATING PIPE ENDS

John Soyland, Youngstown, Ohio

Application December 27, 1932, Serial No. 648,857

3 Claims. (Cl. 91—54)

This invention relates to mechanism for coating the ends of pipes, tubes and other cylindrical articles with a viscous fluid such as lubricant, paint or the like, to afford protection thereto, and is particularly useful for lubricating or painting the threaded ends of galvanized pipes.

In the manufacture of threaded galvanized pipes and other pipes provided with protective surface coatings or specially prepared outer surfaces, the threading of the ends subsequent to the application of the zinc or other coating material removes the latter and exposes the metal of the pipe itself to rust or other corrosion, which is particularly undesirable when the pipe is to be stored or shipped; additionally, in some instances, lubricant is applied by the pipe manufacturer to the pipe threads, whether the pipes be coated or not, to facilitate the application of couplings or other fittings by the ultimate user. Both of these operations have heretofore been performed solely by hand as far as I am aware, the threaded ends of the pipe being merely painted with a coating material or with the lubricant by workmen supplied with brushes and stationed near the opposite ends of the pipes as they are successively moved along a conveyor or other analogous apparatus. The present invention is directed to the provision of a machine for automatically performing a like operation.

A principal object of the invention, therefore, is to provide means adapted for operative association with a pipe conveyor for coating the ends of pipes or the like as they are moved by the conveyor from one station to another.

A further object of the invention is to provide automatic means of this character which are fully effective for the purpose aforesaid and which do not interfere with or in any way delay the ordinary manufacturing and/or finishing processes to which the pipes are normally subjected.

Another object of the invention is to provide apparatus comprising a continuously moving endless belt adapted for engagement by the ends of the pipes as they are carried past it on a conveyor or the like and operative to transfer thereto a thin film of the desired coating material, the invention in its preferred embodiment including also the provision of means for automatically removing any excess coating material which may adhere to the pipes.

Other objects, purposes and advantages of the invention will hereinafter more fully appear or will be understood from the following description in which reference will be had to the accompanying drawings.

In the said drawings, Fig. 1 is a top plan view of mechanism embodying my invention in association with a pipe conveyor of a usual form, the latter being fragmentarily indicated in broken lines; Fig. 2 is a side elevation thereof in which certain parts are broken away into vertical section, and Fig. 3 is a transverse vertical section on the line 3—3 in Fig. 2 looking in the direction of the arrows. In the several figures, like characters are used to designate the same parts.

Pipes and tubes are generally threaded on both ends, and under such circumstances the coating or lubricant is applied to both threaded extremities of each pipe. As previously stated, this operation has heretofore been customarily performed by operators stationed on each side of a conveyor along which the pipes are moved from one station to another with the ends of the pipes generally projecting far enough beyond the sides of the conveyor to enable the coating or lubricant to be conveniently applied by means of a brush. Obviously, where but one end of a series of pipes is to be coated or lubricated, the operatives are stationed on but one side of the conveyor only and, in a similar way, the apparatus of the present invention may be arranged on both sides or on only one side of the conveyor, although the former will normally be the case. However, for present purposes, a description of the apparatus as applied at one side of the conveyor only will suffice to enable those skilled in the art to readily comprehend the invention since, obviously, similar apparatus may be installed on the other side of the conveyor if both ends of the pipes are to be treated.

The conveyor itself, generally designated as C, of which only a portion is indicated in dotted lines, may be of any suitable form adapted to move the pipes consecutively in a substantially horizontal plane from one point to another. It may thus comprise a plurality of endless chains $a$ provided with spaced flights or dogs $b$ respectively moving in parallel horizontally disposed channel skids $c$ over suitably spaced sprockets $d$ driven in any convenient way, the skids being supported on a suitable framework $e$. The pipes are successively delivered to this conveyor in any suitable way or by any convenient means such, for example, as an elevating mechanism, generally designated as E, which may be arranged to receive the pipes consecutively from a threading machine and deposit them on the conveyor for transportation to some other point for storage or shipment; during this transportation, the coating is applied to the ends of the pipes by the mechanism now to be described which forms the subject of my invention. It will be understood, however, that the use of this mechanism is in no way limited to a conveyor of the character indicated as it may be readily associated with other forms of conveyors or, in fact, with substantially any apparatus adapted to consecutively move pipes or other cylindrical objects in a substantially horizontal plane and in a direction substantially transverse of their axes.

More specifically, the coating mechanism of my invention comprises a housing 5 supported at one side of the conveyor from spaced brackets 6 which may be secured to the cross members of the conveyor mechanism or to any other suitable support, the housing being of elongated generally rectangular form, open at the top and bottom and having adjacent one of its ends a pair of axially aligned bosses 8 through which is extended a shaft 9 supporting a driving pulley 10 within the housing and having a driven sprocket 11 secured thereto externally of the housing. A pair of somewhat similar bosses 12 are provided adjacent the other end of the housing in horizontal alignment with the bosses 8, these bosses however, being provided with horizontally extending slots 13 which receive a shaft 14 supporting an idler pulley 10' within the housing, this pulley being rotatable on the shaft 14 and substantially the same size as the pulley 10. The pulleys 10 and 10' support an endless belt 15 which may preferably be made from a plurality of metal links and thus be substantially of the character of a silent chain, although leather, fabric or any other suitable material may be employed if desired, while the shaft 14 is provided at its opposite ends with collars 16 having outwardly projecting threaded studs 17 extending through lugs 18 on the housing and carrying nuts 19 whereby longitudinal adjustment of the shaft with respect to the housing may be effected with corresponding adjustment of the tension on the belt 15.

Ordinarily, a metallic belt of the character mentioned will be found preferable to a fabric or leather one since it is less susceptible to damage from the sharp edges of the pipe threads with corresponding increase in its life; additionally, less frequent adjustment is usually required when a metal belt is employed as the coating fluid often tends to soften belts of other sorts and thus increases their liability to stretch.

The shaft 9 carrying the pulley 10 may be driven through the sprocket 11 by a chain 20 extending over a sprocket 21 mounted on the shaft 22 which is coupled to and forms an extension of the main driving shaft 7 of the conveyor or the sprocket 11 may be mounted on shaft 14 and similarly driven so as to constitute pulley 10' the driving pulley for the belt so that its upper run will operate under greater tension than its lower, or any other suitable driving means for the belt may be employed if preferred, the speed at which it is moved being desirably somewhat less than that of the conveyor chains.

The belt 15 and its supporting pulleys are so arranged with respect to the conveyor that the surface of the upper run of the belt is slightly elevated above the level of the conveyor rails C so that as the pipes are consecutively moved along the conveyor, their ends engage and rest upon the belt, overlapping the latter for a distance somewhat greater than the length of the threads measured inwardly from the extremity of each pipe.

A tank or reservoir 25, which may be formed of sheet metal, surrounds the lower portion of the housing 5 and is suitably supported therefrom preferably by a plurality of hinged clips 26 which permit the tank to be readily removed from the housing for cleaning, a drain cock 27 at the bottom of the tank providing a convenient means for emptying it when attached to the housing. When the machine is in operation, this tank is kept filled with the coating fluid, which may be oil, thin grease, paint or the like, to a level somewhat above that of the lower run of the belt 15 so that the latter in its travel over the pulleys 10, 10' moves through the fluid and picks up a quantity thereof for subsequent transference to the ends of the pipes.

For maintaining the pipes in proper relation to the coating apparatus as they move along the conveyor, suitable means, preferably in the form of a guide rail 28, are provided, this rail being supported from the housing 5 by brackets 29 in substantial alignment with the outer edge of the belt 15, the front end 28' of the rail, that is, the end nearest the point from which the pipes are supplied, being desirably curved outwardly away from the conveyor so that as the pipe ends engage and traverse this curved portion, they are moved thereby into proper relation with the major portion of the rail and in turn the belt, prior to their meeting the latter. Obviously, when two of the coating mechanisms are disposed on opposite sides of the conveyor, these guide rails by cooperation with one or the other end of each pipe will serve to bring it into proper relation with the belts of both mechanisms, but when only one such mechanism is utilized care should be taken to feed the pipes in such manner that the ends which are to be coated will contact the curved portion of the rail so each pipe will be guided to proper position; otherwise, the threads of certain of the pipes might not be coated for their entire length. Moreover, to prevent the upper run of the belt from unduly sagging, a backing plate 30 mounted on spacing sleeves 31 carried by studs or bolts 32 extending through the side plates of the housing 5 is preferably provided, thus insuring contact of the full length of the surface of the upper run of the belt with the pipe ends as they roll along the skids of the conveyor.

Thus, in the operation of the mechanism which has been described, the pipes P are rolled along the channel skids c by the flights b of the conveyor chains with their ends in contact with the belt 15, while the latter is moved over its pulleys 10, 10' and over the plate 30, carrying a quantity of the coating material on its upper surface; the material is thus scraped from the belt and onto the pipe ends as a result of the relative movement therebetween. To insure contact of the entire periphery of each pipe end and consequent coating of the threaded area at all points, the belt is desirably arranged so that its upper horizontal surface or run is of considerably greater length than the circumference of the pipes, so that each of the latter will be rotated through at least one complete revolution while in contact with the belt.

The tank and housing are preferably arranged to extend rearwardly considerably beyond the pulley 10' so that the pipes will travel thereover after leaving the belt for a sufficient time to enable any excess coating material which may adhere to the pipes to drip therefrom through the housing and back into the tank. The removal of such excess is desirably assisted and hastened by an air wiper comprising a tube 35 extending horizontally above the path of the pipe ends adjacent the rear end of the housing and supported therefrom on a bracket 36, the tube which is closed at its front end having a plurality of downwardly directed perforations 37 in its wall. Through these perforations compressed air supplied to the rear end of the tube by a supply pipe 38 may be blown over the ends of the pipes P as they are moved under the tube by the conveyor, thus carrying the excess coating material back into the tank and leaving but a relatively thin film thereof on the surface of the pipe ends.

As heretofore mentioned, the apparatus of my invention is desirably driven from the main drive shaft of the conveyor since when so driven, its operation is entirely automatic except that it is of course necessary that the tank 25 be kept supplied with a sufficient quantity of the coating material to constantly maintain it at a level to at least contact the surface of the lower run of the belt 15. Moreover, the air wiper supplements the normal flow of the material to remove the excess coating material from the ends of the pipes and return it to the tank, and it is thus apparent that substantially none of the coating material is wasted, only that necessary to coat the pipe ends with a thin film thereof being actually removed from the apparatus, so that the supply in the tank may be kept at or above the lowest operative level merely by the addition from time to time of the relatively small amounts necessary to compensate for that used up in forming the thin film coating on the ends of the pipes.

While I have herein described a preferred embodiment of my invention with considerable particularity, I wish it to be understood that I do not intend thereby to limit or confine myself thereto in any way since changes and modifications in the form and arrangement of the several parts and in other particulars will readily occur to those skilled in the art and may be made if desired without departing from the spirit and scope of the invention as defined in the appended claims.

Having thus described my invention, I claim and desire to protect by Letters Patent of the United States:

1. In combination with a conveyor for moving cylindrical articles, apparatus for coating the ends of said articles as they are successively moved along the conveyor comprising an endless belt extending parallel to the path of movement of the articles adapted for engagement by their ends during said movement, means for driving the belt, means for supplying a coating fluid thereto, and means for removing excess coating fluid from said ends after they have traversed the belt, said means comprising a tube extending parallel to the belt and having downwardly opening perforations through its wall, and means for supplying compressed air to said tube.

2. In combination with a conveyor for moving threaded pipe, apparatus for painting the ends of said pipe as they are successively moved along the conveyor, comprising an endless belt extending parallel to the path of movement of the pipes adapted for engagement by their threaded ends during said movement, means for driving the belt, means for supplying paint thereto, and means for spreading the paint from the tops of the threads to the roots thereof and for removing excess paint from said ends after their engagement with the belt, said means comprising a tube disposed above and parallel to the belt having downwardly opening perforations through its wall and means for supplying compressed air to said tube.

3. Apparatus for painting threaded pipe ends comprising a pair of spaced rotatable pulleys having parallel axes, means for driving one of the pulleys, a flexible belt carried by said pulleys and adapted to apply paint successively to the ends of the pipes, means for moving the pipes relatively to said belt while in engagement therewith along a horizontal path normal to the axes of said pulleys, a perforated tube extending above and parallel to the path of the pipes after they have traversed said belt, and means for forcing jets of air through the perforations in said tube and against the pipe ends to thereby spread into the roots of the threads the paint disposed by the belt on their tops and thereafter remove excess paint from the pipes.

JOHN SOYLAND.